Figure 1:
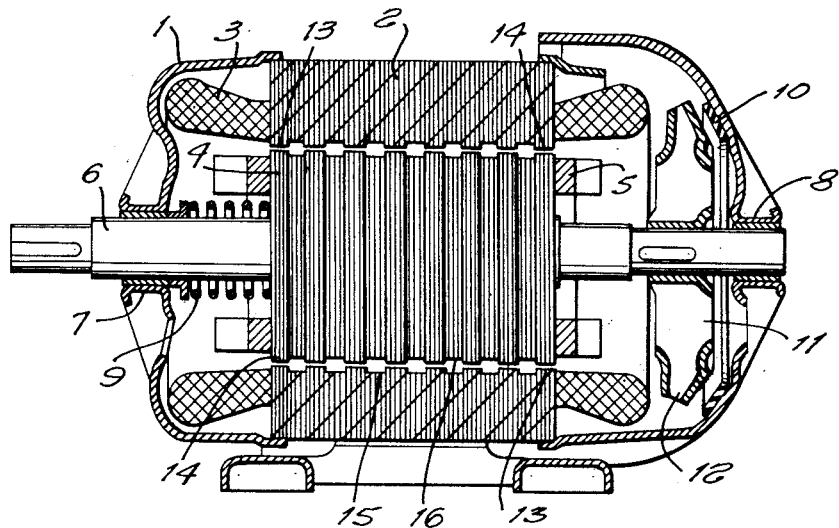

Nov. 16, 1954     B. HINZ     2,694,781
ELECTRIC MOTOR WITH AXIALLY SLIDABLE ARMATURES
Filed Dec. 11, 1951     3 Sheets-Sheet 1

INVENTOR
BRUNO HINZ

Nov. 16, 1954  B. HINZ  2,694,781
ELECTRIC MOTOR WITH AXIALLY SLIDABLE ARMATURES
Filed Dec. 11, 1951  3 Sheets-Sheet 3

INVENTOR
BRUNO HINZ
BY

United States Patent Office 2,694,781
Patented Nov. 16, 1954

2,694,781

ELECTRIC MOTOR WITH AXIALLY SLIDABLE ARMATURES

Bruno Hinz, Kirchen, Sieg, Germany

Application December 11, 1951, Serial No. 260,970

18 Claims. (Cl. 310—77)

Electric motors with axially slidable armatures having a cylindrical rotor and a cylindrical bore in the stator are known in which an axial force is exerted on the rotor according to the axial displacement desired, both the stator and the rotor, in the direction of the length of the air gap, being provided with non-magnetic interruptions in the active iron. As certain top limits are set with respect to the power factor of alternating current motors and consequently for the magnetizing component, air gap reluctance must be limited. If a motor includes non-magnetic interruptions then air gap reluctance can be maintained low only by increasing the length of the motor since the dimensions of the active iron may not be reduced.

The force effective to displace the rotor axially may also be obtained by providing a conical rotor which is drawn into a conical bore in the stator to a position in which the air-gap is reduced. Such motors require special construction for which special manufacturing processes are required, and such motors are of greater diameter than equivalent motors having cylindrical rotors.

According to this invention, the increased length of the motor is avoided by the provision of axial air-gaps, without dependance upon conical construction of the rotor. The invention is characterised by the core surfaces of stator and rotor which form the boundaries of the air gap and are provided with a number of shallow grooves spaced axially along the air gap, so that the field generated by the motor winding exerts an axial attractive force tending to align the grooves on the rotor and stator while exerting the usual rotative force or torque. Rotor and stator may be of cylindrical construction as distinguished from conical. In the axial direction, the stack of laminations need not be interrupted by non-magnetic material. The motor thus, as it were, provides a combined thrust magnet and rotating motor, the magnetic field induced by the motor winding serving both to produce the torque and to generate an axial force for controlling a brake, a clutch, or the like. By altering the cross-section of the grooves, both the maximum degree of the axial force and the direction of the axial force may be arbitrarily determined as a function of the path of displacement. In the operating position, that is to say, with the field under current, the rotor need not be fixed axially in one direction as has heretofore been required in conical sliding armature motors. In operating position, the rotor may be mounted to be mechanically unobstructed in the axial direction except insofar as it is opposed by the axial force or reaction of the braking or clutching apparatus which it actuates. Thus the shock, which hitherto had to be taken into consideration when the rotor moved into the position of operation, is also avoided.

The grooves may be formed in different ways, particularly by turning after stacking, or by any other shaping treatment by machine tool, for example by milling. In the latter case, the individual grooves may be milled in any suitable manner into parts of the stator or rotor peripheries.

The invention is of particular application to motors having a cylindrical rotor, but without being limited thereto. According to the invention, sliding-armature motors, in which the rotor is of conical form, and which have thus a hollow-conical stator, may also be provided with grooves, so that thus an increased axial force is obtained which is generated both by the conical shape and by the grooves. In this manner, at a determined cone-pitch greater axial forces can be obtained than has hitherto been possible. Inversely, when starting from a determined axial force as required, the cone-pitch may be provided less than hitherto, by providing the grooves as hereinbefore described according to the invention. According to the invention furthermore, sliding-armature motors with conical rotor now in use may be provided with a higher axial attractive force by machining the grooves as and in the manner hereinbefore described. The conditions above referred to regarding the dimensions and the shape of the grooves and poles apply also to these motors. By combining the effects of the conical shape and of the grooves, it is not only possible to increase the axial force, but by changing the form and division of the grooves a tendency of the axial force to decrease along the path of displacement may be obtained, and if desired, also an axial force which remains constant along the path of displacement.

Figure 2:
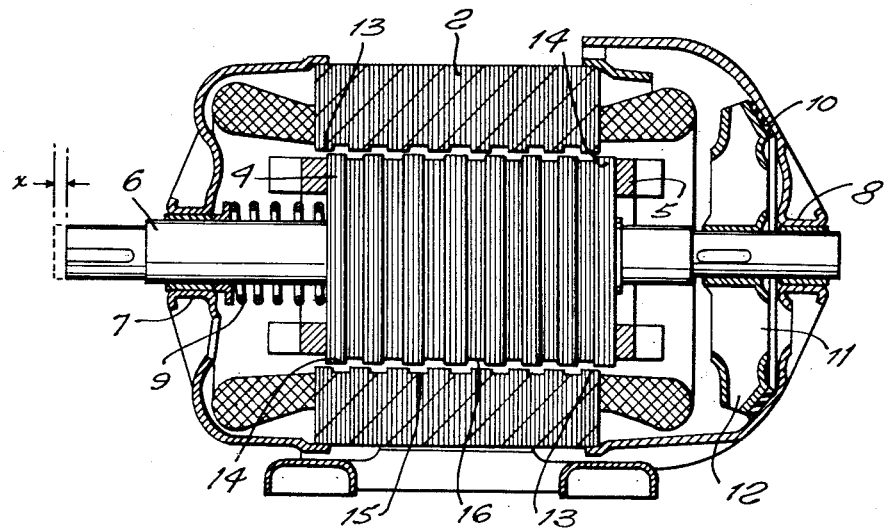
Figure 3:
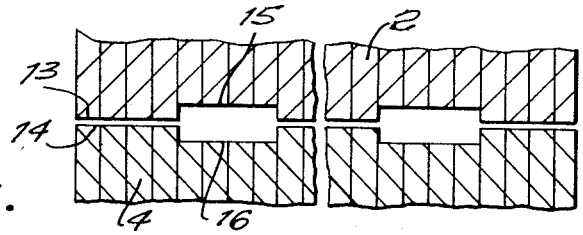
Figure 4:
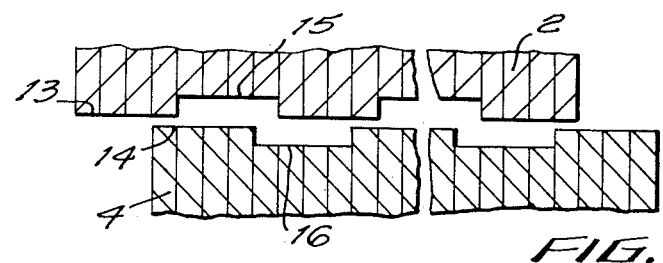
Figure 5:
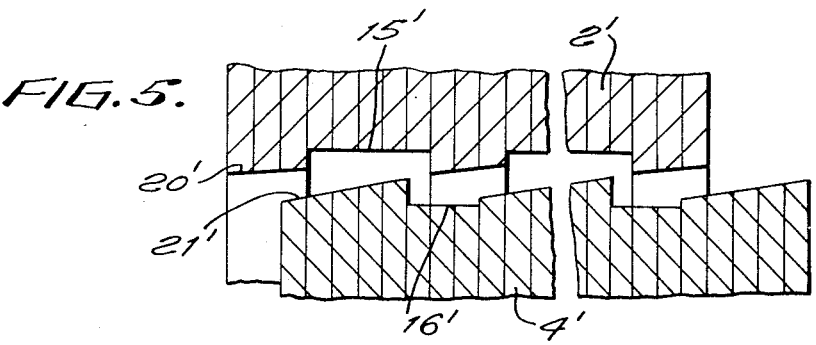
Figure 6:
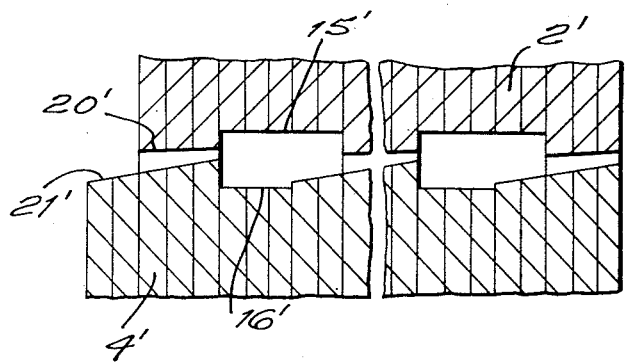
Figure 7:
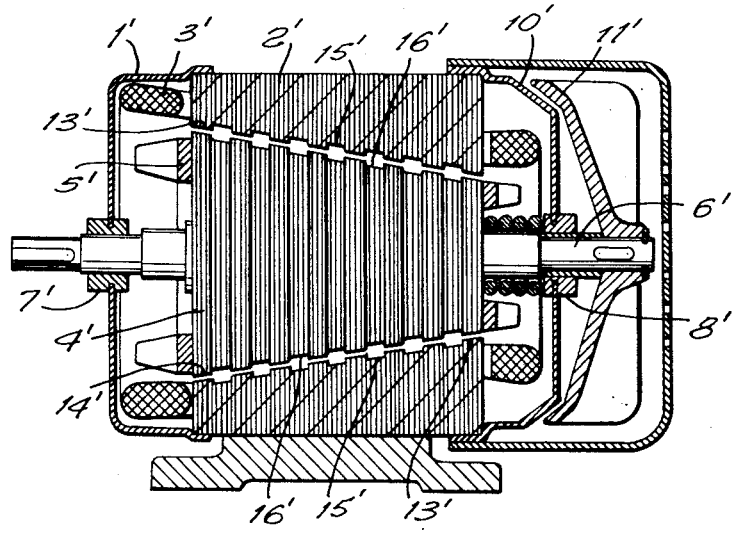
Figure 8:
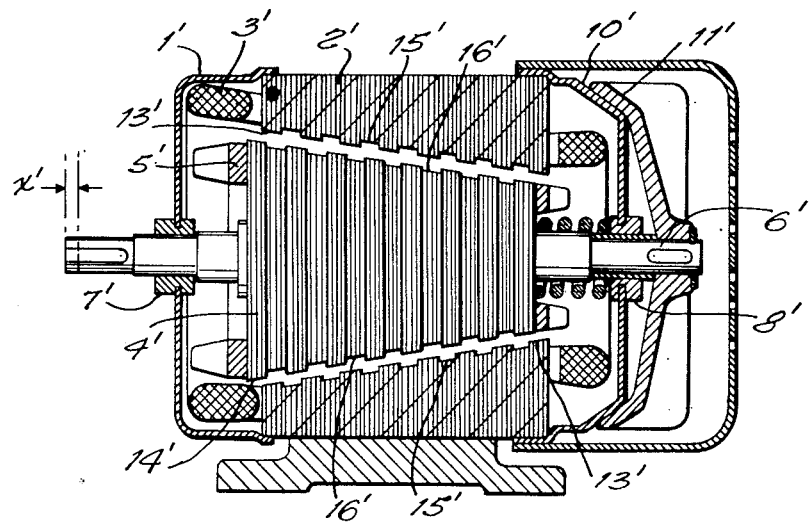

Several constructions of apparatus according to the invention are diagrammatically illustrated by way of example in the accompanying drawings:

Figures 1 and 2 show a three-phase short circuit armature motor, in front elevation, partly in section, Figures 3 and 4 are sections of stator and rotor on an enlarged scale, Figures 5 and 6 show modified constructions of the grooves in the rotor, Figures 7 and 8 show a section through a motor with conical rotor.

Referring to Figures 1 and 2 of the drawings, the stator 2, consisting of laminations, with the winding 3 is provided in known manner in a motor housing 1. The stator 2 surrounds the rotor 4 which has a short-circuit winding 5 and a shaft 6. The shaft 6 is supported in bearings 7 and 8 so as to be axially displaceable. A spring 9 exerts a force on the rotor tending to displace it in the direction of the stationary brake disc 10, which cooperates with a brake-disc 11 which is secured to the shaft 6. As illustrated, the brake disc 11 may at the same time be constructed as a fan.

In the core surface 13 of the stator, and in the core surface 14 of the rotor, are provided grooves 15 and 16 which, when the rotor is in the position of operation, are almost opposite each other. The lands or projections between the grooves 15 or 16 are herein sometimes referred to as poles and the space between corresponding portions of adjacent poles is herein sometimes referred to as the pole pitch. This pole pitch is measured in the axial direction of the rotor and is not to be confused with the circumferential pole pitch of the stator. As shown in the figures the pole pitch may advantageously remain constant as one proceeds from one end to the other. This position of operation is shown in Fig. 1 and on an enlarged scale in Figure 3. However, when the motor is switched-off the spring 9 forces the rotor axially to one side so that the relative positions of rotor and stator grooves is as illustrated in Fig. 2 and on an enlarged scale in Figure 4. In this position the rotor is braked by means of the cooperating brake discs 10, 11.

When the motor is switched-on, in addition to the torque an axial force is generated which draws the rotor into the field against the action of the spring 9 until the grooves 15 and 16 are almost opposite each other again. In the position of operation, that is with the motor running, there need be no mechanical restraint against axial shifting as is required in the case of cone type rotors since axial thrust decreases as the poles approach alignment while the opposing force of the spring 9 increases. A position of balance is thus approached without mechanical shock when the motor is energized. The grooves 15 and 16 may be distributed throughout the entire axial extent of the rotor and stator or for a fraction of this extent only, depending upon the intensity of thrust desired.

The axial attractive force is not constant along the path of displacement $x$. It is greatest at the beginning and decreases gradually in the direction of the operating position of the rotor 2. It is possible to control the extent of change of the axial force along the path of displacement by the form of grooves, and the poles or the portions of the rotor and stator left between them. For example, this may be done by means of the construction of rotor and stator as illustrated in Figures 5 and 6, according to which the grooves 16 in the rotor 4 are narrower than the grooves 15 in the stator 2. The portions of the stator and rotor left between the grooves are bored hollow-conically or conically as may be seen at 20 and 21.

In all constructions given by way of example, it is essential that the path of displacement $x$ be not more than the distance between two corresponding poles of stator and rotor. Preferably, it is smaller than the width of the grooves 15 in the stator 2. A considerable attractive force is thus obtained when the rotor is transferred from the braked position into the operating position, and the axial attractive force increases substantially only just before the operating position of the rotor is reached where the opposition of spring 9 is the greatest so that an acceleration in the axial direction does not occur.

Other lines of attractive force which correspond in given cases to the desired behaviour of the rotors when the brake is released or when a clutch is disengaged or thrown-in, may be obtained by changing the form of the core surfaces of stator and rotor.

Figures 7 and 8 show an example of a conical sliding armature motor with machined grooves therein. The reference numerals are the same as in Figures 1 and 2, the only difference consisting in the hollow-conical form of the stator and the conical form of the rotor. The rotor is shown in the operative position in Fig. 7 and in the braked position in Fig. 8.

The invention is not limited to short-circuit armature motors, but it may be applied to all motors, particularly to alternating current motors.

What I claim is:

1. In an electric motor, in combination, an outer stator including angularly spaced poles arranged equidistant from a predetermined central axis and having inner pole surfaces disposed in a common cylindrical surface of revolution with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor; resilient means permanently urging said rotor from its running into its displaced position; and a winding associated with said stator for energizing the same and causing thereby sliding of said rotor from its displaced into its running position against the action of said resilient means.

2. In an electric motor, in combination, a rotor having an axis of rotation and a cylindrical rotor surface with grooves therein extending transverse to said axis so as to form rotor pole ridges on said rotor surface; means supporting said rotor turnably in axially displaceable position, said rotor being displaceable between a running position and a shifted position; an outer stator including angularly spaced poles arranged about said rotor and having part cylindrical inner pole surfaces adjacent and slightly spaced from said rotor pole ridges on said rotor and having grooves formed therein extending transverse to said rotor axis so as to form on said inner pole surfaces transversely extending pole ridges arranged in running position of said rotor opposite said rotor pole ridges and axially displaced with respect thereto in shifted position of said rotor; means permanently urging said rotor from its running into its shifted position; and means associated with said stator for energizing the same and causing thereby sliding of said rotor from its shifted into its running position against the action of said urging means.

3. In an electric motor, in combination, a rotor arranged for rotation about its axis and being axially shiftable between running and shifted positions and axially urged toward said shifted position, said rotor having a cylindrical rotor surface formed with grooves therein extending transverse to said axis so as to form rotor pole ridges on said rotor surface; an outer stator including angularly spaced poles arranged about said rotor and having part cylindrical inner pole surfaces adjacent and slightly spaced from said rotor pole ridges on said rotor and having grooves formed therein extending transverse to said rotor axis so as to form on said inner pole surfaces transversely extending pole ridges arranged in running position of said rotor opposite said rotor pole ridges and axially displaced with respect thereto in shifted position of said rotor; and means associated with said stator for energizing the same and causing thereby sliding of said rotor from its shifted into its running position.

4. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, said grooves in said rotor and stator extending around a substantial part of the periphery of said rotor and said stator, respectively; resilient means permanently urging said rotor from its running into its displaced position; and a winding associated with said stator for energizing the same and causing thereby sliding of said rotor from its displaced into its running position against the action of said resilient means.

5. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, said grooves in said rotor and stator extending over the entire periphery of said rotor and said stator, respectively; resilient means permanently urging said rotor from its running into its displaced position; and a winding associated with said stator for energizing the same and causing thereby sliding of said rotor from its displaced into its running position against the action of said resilient means.

6. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, said grooves in said stator and rotor being of rectangular cross section; resilient means permanently urging said rotor from its running into its displaced position; and a winding associated with said stator for energizing the same and causing thereby sliding of said rotor from its displaced into its running position against the action of said resilient means.

7. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, said rotor and said stator being axially displaceable with respect to each other a distance less than the width of the grooves therein; resilient means permanently urging said rotor from its running into its displaced position; and a winding associated with said stator for energizing the same and causing thereby sliding of said rotor from its displaced into its running position against the action of said resilient means.

8. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, the grooves in said rotor being narrower than the grooves in said stator; resilient means permanently urging said rotor from its running into its displaced position; and a winding associated with said stator for energizing the same and causing thereby sliding of said rotor from its displaced into its running position against the action of said resilient means.

9. In an electric motor, in combination, an outer stator including angularly spaced poles arranged equidistant from a predetermined central axis and having part conical inner pole surfaces with grooves formed therein extending transverse to said central axis and forming on said pole surfaces transversely extending pole ridges; a rotor arranged within said stator turnably about said central axis and slidably in the direction thereof, said rotor having an outer conical rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor; resilient means permanently urging said rotor from its running into its displaced position; and a winding associated with said stator for energizing the same and causing thereby sliding of said rotor from its displaced into its running position against the action of said resilient means.

10. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor; resilient means permanently urging said rotor from its running into its displaced position; a winding associated with said stator for energizing the same and causing thereby sliding of said rotor from its displaced into its running position against the action of said resilient means; and means operable by said rotor when the same is moved into its displaced position.

11. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor; resilient means permanently urging one of said rotor and said stator away from the other and away from said running position; and a winding associated with said stator for energizing the same and causing thereby sliding of one of said stator and said rotor from its displaced into its running position against the action of said resilient means.

12. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, the opposite pole surfaces on said pole ridges of said stator and rotor lying at an angle relative to said central axis; resilient means permanently urging said rotor from its running into its displaced position; and a winding associated with said stator for energizing the same and causing thereby sliding of said rotor from its displaced into its running position against the action of said resilient means.

13. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges, said pole surfaces on said pole ridges lying substantially parallel to said central axis; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, said pole surfaces on said pole ridges of said rotor lying at an angle relative to said central axis; resilient means permanently urging said rotor from its running into its displaced position; and a winding associated with said stator for energizing the same and causing thereby sliding of said rotor from its displaced into its running position against the action of said resilient means.

14. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, the grooves in said rotor being narrower than the grooves in said stator; resilient means permanently urging said rotor from its running into its displaced position; and a winding associated with said stator for energizing the same and causing thereby sliding of said rotor from its displaced into its running position against the action of said resilient means.

15. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges, said pole surfaces on said pole ridges lying substantially parallel to said central axis; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor, the grooves in said rotor being narrower than the grooves in said stator, said pole surfaces on said pole ridges of said rotor lying at an angle relative to said central axis; resilient means permanently urging said rotor from its running into its displaced position; and a winding associated with said stator for energizing the same and causing thereby sliding of said rotor from its displaced into its running position against the action of said resilient means.

16. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a motor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor; resilient means permanently urging said rotor from its running into its displaced position; a winding associated with said stator for energizing the same and causing thereby sliding of said rotor from its displaced into its running position against the action of said resilient means; and brake means operable by said rotor when the same is moved into its displaced position.

17. In an electric motor, in combination, an outer stator including angularly spaced poles arranged equidistant from a predetermined central axis and having part cylindrical inner pole surfaces with grooves formed therein extending transverse to said central axis and forming on said pole surfaces transversely extending pole ridges; a rotor arranged within said stator turnably about said central axis and slidably in the direction thereof, said rotor having an outer rotor surface spaced a slight distance from said inner pole surfaces of said stator and having grooves therein extending transversely to said central axis so as to form pole ridges on said outer rotor surface arranged in running position opposite said pole ridges on said inner stator pole surfaces and axially displaced with respect thereto in axially displaced position of said rotor; resilient means permanently urging said rotor from its running into its displaced position; a winding associated with said stator for energizing the same and causing thereby sliding of said rotor from its displaced into its running position against the action of said resilient means; and clutch means operable by said rotor when the same is moved into its displaced position.

18. In an electric motor, the combination comprising an outer circular magnetic stator member having rotatively acting angularly spaced poles, axially acting circumferential poles separated by relatively shallow circumferential grooves traversing the faces of the rotatively acting poles, said grooves being transversely disposed with respect to the axis of said stator member, an internal magnetic motor member disposed in flux conducting relation and concentric with said stator member with surface areas facing said stator to form an air gap therebetween and having axially acting circumferential poles separated by relatively shallow spaced grooves transverse to the axis of said rotor, said stator member and said rotor member being axially displaceable with respect to one another toward and away from a running position, means urging said stator and rotor members axially away from said running position and a winding for exciting said stator to cause relative rotation and axial displacement between said stator and rotor.

References Cited in the file of this patent

UNITED STATES PATENTS

| Number | Name | Date |
|---|---|---|
| 1,557,213 | Lee | Oct. 13, 1925 |
| 1,640,742 | Wallace et al. | Aug. 30, 1927 |
| 1,771,281 | Wilsing | July 22, 1930 |

FOREIGN PATENTS

| Number | Country | Date |
|---|---|---|
| 285,089 | Great Britain | May 10, 1929 |
| 917,090 | France | Sept. 2, 1946 |
| 691,893 | Germany | June 7, 1940 |
| 93,681 | Switzerland | Mar. 16, 1922 |